United States Patent [19]

Jackman

[11] 4,326,111
[45] Apr. 20, 1982

[54] INERTIA SWITCH DEVICE

[75] Inventor: Peter R. Jackman, Basingstoke, England

[73] Assignee: Inertia Switch Limited, England

[21] Appl. No.: 74,143

[22] Filed: Sep. 10, 1979

[30] Foreign Application Priority Data

Jan. 21, 1978 [GB] United Kingdom ............... 1294/78
May 31, 1978 [GB] United Kingdom ............. 19375/78

[51] Int. Cl.³ .......................................... H01H 35/14
[52] U.S. Cl. ............................. 200/61.45 R; 200/61.5; 337/2
[58] Field of Search ............... 200/61.45 R, 61.45 M, 200/61.48, 61.5, 61.45; 337/2-10, 332, 333, 362, 363; 361/114, 115, 131

[56] References Cited

U.S. PATENT DOCUMENTS

| | | | |
|---|---|---|---|
| 2,139,183 | 12/1938 | Bruns | 280/281 |
| 2,550,778 | 5/1951 | Cohen | |
| 2,952,752 | 9/1960 | Weaver | 200/61.45 R |
| 3,641,290 | 2/1972 | Murphy | 200/61.45 R |
| 4,013,995 | 3/1977 | Adamo | 200/61.45 |

FOREIGN PATENT DOCUMENTS

| | | |
|---|---|---|
| 1402970 | 5/1965 | France . |
| 2126292 | 10/1972 | France . |
| 492583 | 8/1970 | Switzerland . |
| 944096 | 12/1963 | United Kingdom . |

Primary Examiner—James R. Scott
Attorney, Agent, or Firm—Hill, Van Santen, Steadman, Chiara & Simpson

[57] ABSTRACT

An inertia switch having an inertia mass, in the form of a ball resting in a conical seat, which mass is responsive to applied acceleration or deceleration in any direction in a horizontal plane and is arranged to operate change-over electrical contacts connected in an electrical circuit for unlocking the electrically operated door locks of an automobile.

10 Claims, 7 Drawing Figures

INERTIA SWITCH DEVICE

TECHNICAL FIELD OF THE INVENTION

This invention relates to an inertia switch device and concerns such a device for opening or closing an electrical circuit in response to an acceleration or deceleration attaining a predetermined threshold value.

BACKGROUND ART

Devices of this kind are known in which an inertia mass, held in an inoperative position by a spring or magnet, is freed by an acceleration of predetermined intensity to effect the opening or closing of an electrical circuit by appropriate means. However, such devices have the disadvantage that they can generally only operate in conjunction with a normally open or normally closed circuit in a single switching mode.

DISCLOSURE OF THE INVENTION

Accordingly, it is an object of the invention to mitigate this disadvantage.

According to the present invention an inertia switch device comprises a movable inertia mass, a first electrical contact movable between a first stable position in which it engages a second electrical contact and a second stable position in which it engages a third electrical contact, and operating means engageable by the inertia mass and arranged so that on an applied acceleration or deceleration exceeding a threshold value, the first electrical contact is moved from the first to the second stable position.

The inertia switch device may also include resetting means for returning the first electrical contact to the first stable position. The resetting means may also be arranged to return the inertia mass to an initial position after actuation by an imposed acceleration or deceleration attaining the threshold value. The operating means may comprise a first arm overlying the inertia mass, a second arm pivotally mounted on a support member which also carries the first electrical contact for pivotal movement between the two stable positions, and resilient biasing means connecting the second arm and the first contact to bias the first contact toward the second stable position when the operating means is actuated by the inertia mass. The resilient biasing means preferably comprises a tension spring.

The inertia switch device may be enclosed in a housing having a first part containing the inertia mass and a second part containing the three electrical contacts and the housing may be provided with first, second and third electrical terminals which are respectively electrically connected to the first, second and third electrical contacts and accessible from the exterior of the housing.

The inertia switch device may also include means for providing a visual indication that the operating means has been engaged by the inertia mass and has moved the first electrical contact from the first to the second stable position. The visual indication means may comprise a manually operated button extending through a wall of the housing to provide said indication, and operable to return the first electrical contact to the first stable position. A thermally responsive device may be connected in series with the second arm and arranged to open-circuit a series connection between the first and second electrical contacts when the temperature exceeds a predetermined value.

The inertia switch device may also include thermally responsive means adapted to move the first contact from the second to the first stable position when the temperature exceeds a predetermined value.

The inertia switch device may be connected in an electrical circuit for locking and unlocking at least one door of a vehicle, the first contact being adapted to lock the door when in the first stable position and to unlock the door when moved to the second stable position. Delay means may be provided to prevent, for a predetermined time after the actuation by an imposed acceleration or deceleration attaining the threshold value, resetting of the first electrical contact to the first stable position so as to lock the doors.

The delay means may include capacitance means arranged to be charged and to disconnect a locking circuit for the door in response to a flow of current due to the movement of the first contact to the second stable position. The capacitance means may be adapted to prevent a drain on the power source if a door operating switch is held operated for a time in excess of that required to lock or unlock a door.

In an alternative arrangement, the delay means comprise thermally responsive means arranged to disconnect a locking circuit for the door in response to a flow of current due to the movement of the first contact to the second stable position.

Embodiments of the invention are hereinafter described, by way of example, with reference to the accompanying drawings.

BEST MODES FOR CARRYING OUT THE INVENTION

Figure 1:
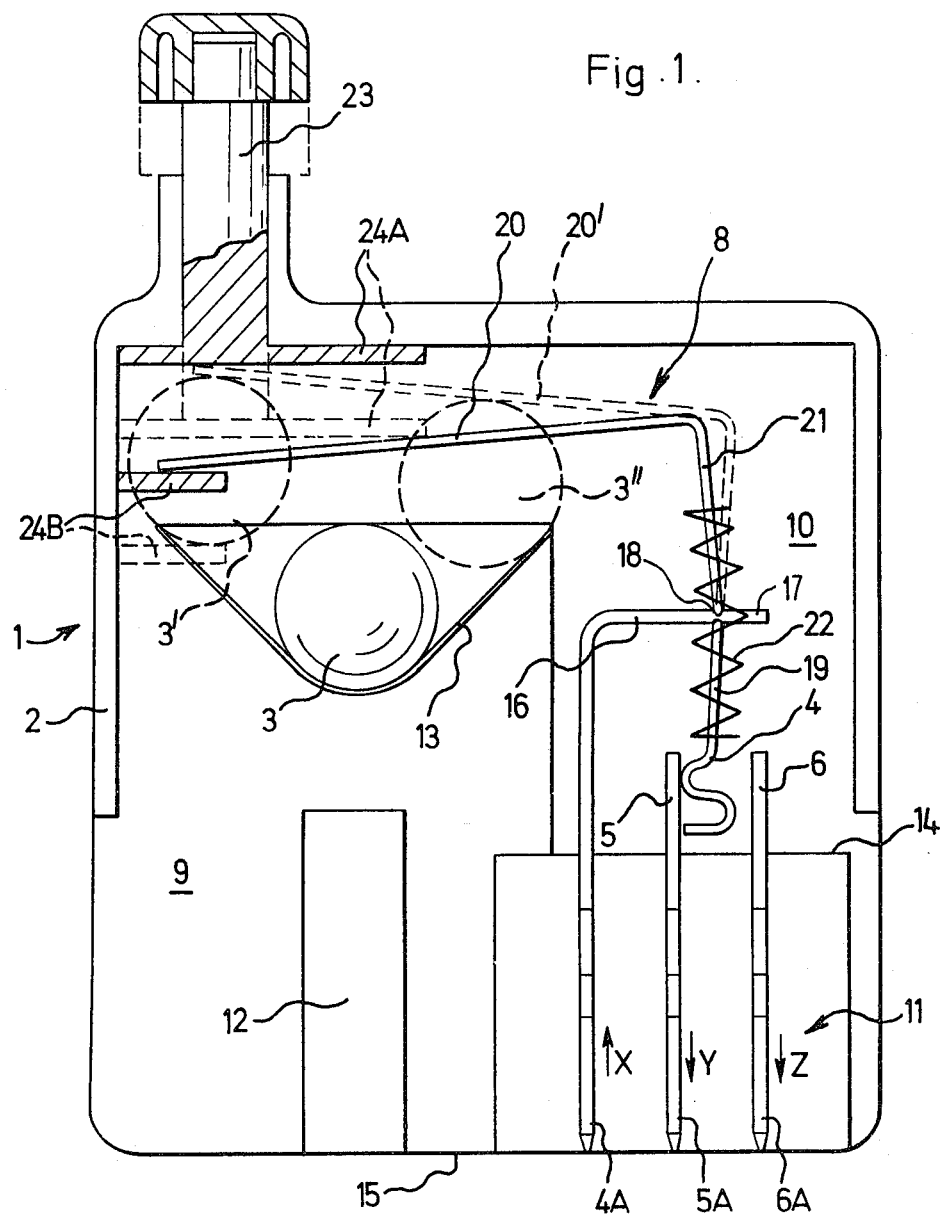
FIG. 1 is a longitudinal cross-sectional view of an inertia switch device in accordance with the invention.
Figure 2:
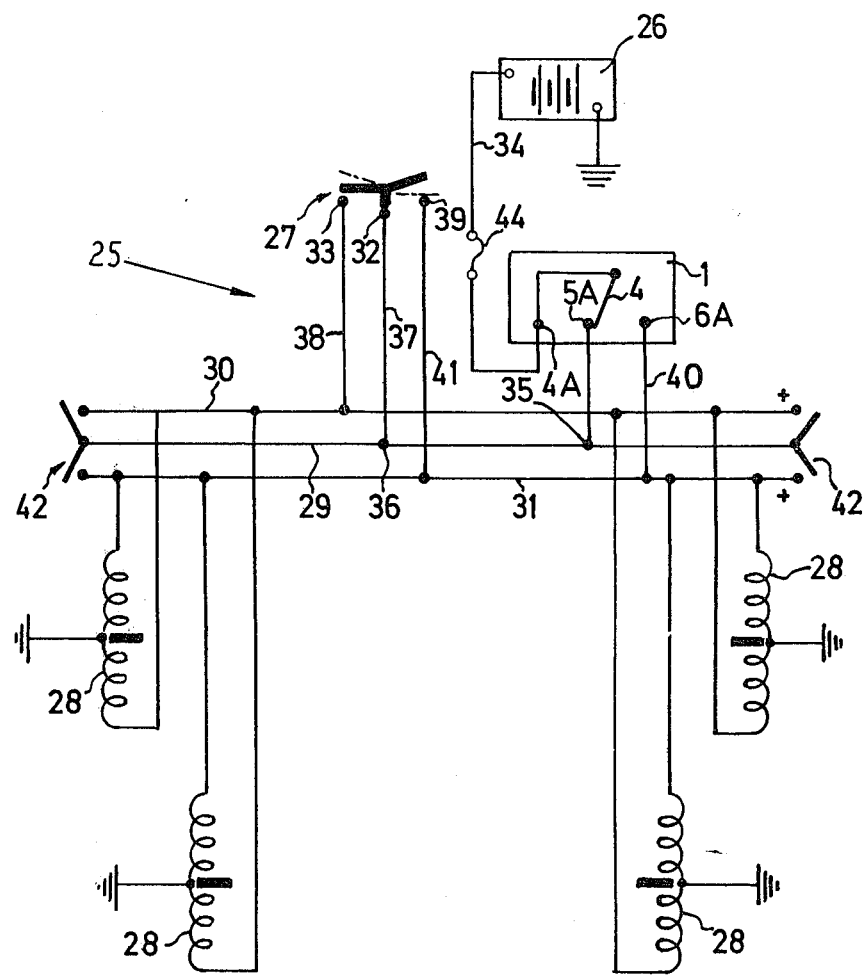
FIG. 2 is a schematic circuit diagram of an automobile door locking arrangement including the inertia switch device of FIG. 1.

In FIGS. 1 and 2, there is shown an inertia switch device 1. The device 1 has a housing 2 in which are mounted an inertia mass 3, a group of three fixed electrical terminals 4A, 5A and 6A, a first, electrically conductive movable electrical contact 4 which is engageable with a pair of second and third fixed electrical contacts 5 and 6 which are integral with the terminals 5A and 6A, and a switch means 8.

The housing 2 has a first internal part 9 in which the inertia mass 3 is housed and a second internal housing part 10 containing the first, second and third contacts 4, 5 and 6. The housing 2 has an external rebate or recess 11 accommodating the three electrical terminals 4A, 5B and 6B, below the interior housing part 10, as viewed in FIG. 1.

The inertia mass 3 comprises a spherical steel ball which is normally restrained by a magnet 12 in a frusto-conical seat 13 (in the lowermost position shown in FIG. 1). The force of the magnet 12 is such that it is overcome by the attainment of a predetermined threshold value of acceleration or deceleration acting on the device 1 and thus on the ball 3. When this threshold value is attained the ball 3 moves away from the seat 13 to either of the positions 3′ or 3″.

The three electrical terminals 4A, 5A and 6A are parallel and extend from the housing part 10 through a wall or partition 14 into the recess 11. They terminate at the level of a bottom wall 15 of the housing 2, as viewed. The first terminal 4A carries a support bracket 16 which extends at an angle of 90° to the terminal 4A. The support bracket 16 terminates in a bifurcated end portion having two limbs 17 (FIG. 3) each of which has a pair of oppositely facing indentations or depressions 18 as shown in FIG. 1. All three terminals are made of metal strip, and in this embodiment the support bracket 16 is integral with the terminal 4A and so also made of metal strip. In use, the first terminal 4A carries current into the device 1 in the direction of the arrow X and current is carried out of the device 1 in the directions of arrows Y and Z by the second and third terminals 5A and 6A.

The movable electrical contact 4 has a generally 'S'-shaped end, as shown in FIG. 1, the upper limb of the 'S'-shaped end having a generally linear part 19 which is bifurcated (not shown), the limbs forming a bifurcation bearing on the underside of the support bracket 16 at the indentations 18. The central recess between the limbs of the bifurcations in the parts 16 and 19 are aligned in the vertical sense, as viewed in FIGS. 1 and 3.

Figure 3:
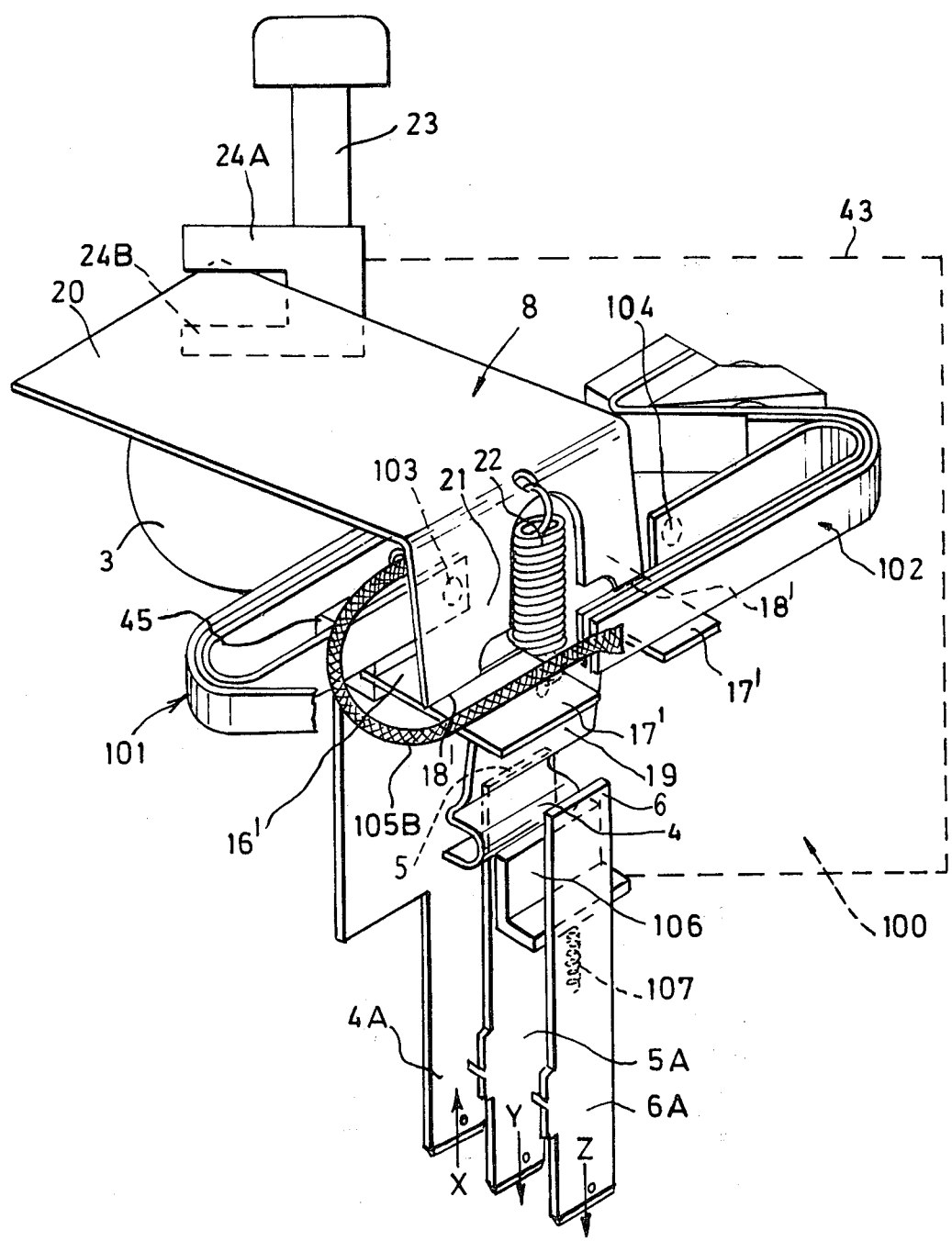
FIG. 3 is a fragmentary perspective view showing the essential features of another inertia switch device in accordance with the invention.

The switch means 8 comprise a generally 'L'-shaped member having first and second arms 20 and 21. The arm 20 extends between the first and second housing parts 9 and 10 in the first of which it overlies the inertia mass 3. The arm 21 is wholly within the second housing part 10 and is bifurcated at its lower end, as shown in FIG. 3, each end being seated for pivotal movement in one of the indentations 18 in the limbs 17 of the support bracket 16 carried by the terminal 4A. There are resilient biasing means in the form of a tension spring 22 hooked at opposite ends into a hole in the arm 21 (best seen in FIG. 3) and a hole in the part 19 of the movable contact 4. The spring 22 lies between the limbs of the respective bifurcations and normally acts to urge the first contact 4 member against the second contact 5 formed integral with the second terminal 5A.

There are also reset means in the form of a finger or thumb operable button 23 which has forked ends 24A and 24B (shown schematically in FIG. 3) in which one end of the arm 20 of the switch means 8 is received.

The use of the inertia switch device of FIG. 1 is hereinafter described in relation to a circuit 25 (shown in FIG. 2) for electrically operated door locks of a vehicle such as an automobile. The circuit 25 is powered by a battery 26 and includes a dash board switch 27 of the "normally off" rocker type and four solenoid operated door locks 28, there being in this case four locks as it is assumed that the automobile has four doors. The circuit 25 has a center power line 29, a lock line 30 and an unlock line 31 connected to the appropriate sides of the solenoids 28 The inertia switch device 1 is connected so that it is normally open and current normally enters via the first contact 4 and normally leaves via the second contact 5. The third contact 6, formed integral with the third terminal 6A, is connected to the unlock line 31. There is a thermal circuit breaker 44 in the circuit 25 between the battery 26 and the inertia switch device 1.

In normal operation, the inertia mass 3 is in position on the seat 13 and the movable contact 4 is in contact with the second contact 5. If it is desired to lock the four door locks, the dash board switch 27 is rocked downwardly to the left, as viewed in FIG. 2, so that contact is made between points 32 and 33 of the switch 27. Current then passes from the battery 26 along a line 34 to a point 35 on the center power line 29, along that line to a point 36, along a line 37 to the point 32 of the switch 27 to the point 33, thence along a line 38 to the lock line 30. All four solenoids 28 are then actuated to lock the doors. The switch 27 is then released. It will be appreciated that the switch 27 is only held on for a very short time and in that time the doors are locked simultaneously.

To unlock the doors, the switch 27 is rocked to the right, as viewed in FIG. 2, to make contact between the point 32 and a point 39 of the switch. Current then passes via a line 41 to the unlock line 31 from the battery 26 and thence to the door lock solenoids 28, which are actuated to unlock the doors.

Normally the doors will be locked during a journey. If there is an accident, an acceleration or deceleration is applied to the inertia switch 3 and the predetermined threshold value is attained or exceeded. The inertia mass 3 is then urged upwardly (as viewed in FIG. 1) to the position 3′ or 3″, in either one of which it strikes the arm 20 of the switch means 8 and urges it to the uppermost position 20′ shown in dashed lines (FIG. 1). This causes the limbs of the bifurcation of the arm 21 to pivot about their points of engagement in the indentations 18 in the support bracket 16 carried by the first terminal 4A. This in turn stretches the spring 22 and moves it to an unstable position where it is over "dead center" to restore equilibrium. In doing so it pulls or flicks the movable contact 4 to the right from its first end position in contact with the second contact 5 to contact the third contact 6 in its second end position. Current then flows directly from the battery 26 to the unlock line 31 along the line 40 (FIG. 2), by-passing the dashboard switch 27. The solenoids 28 are thus operated to unlock the door locks.

The thermal circuit breaker 44 protects the circuit 25 by breaking the circuit when a predetermined temperature rise occurs in the separate circuit breaker, so preventing self-welding of the contact 4 to either of the contacts 5 and 6.

The inertia switch device 1 can be reset by pressing the button 23 downwardly so that the arm 20 and the inertia mass 3 are moved to their initial positions. Movement of the arm 20 necessarily pivots the arm 21 too and this in turn moves the spring over "dead center" again to flick the movable contact 4 from the second end position in contact with the third contact 6 to the first end position in contact with the second contact 5.

Figure 4:
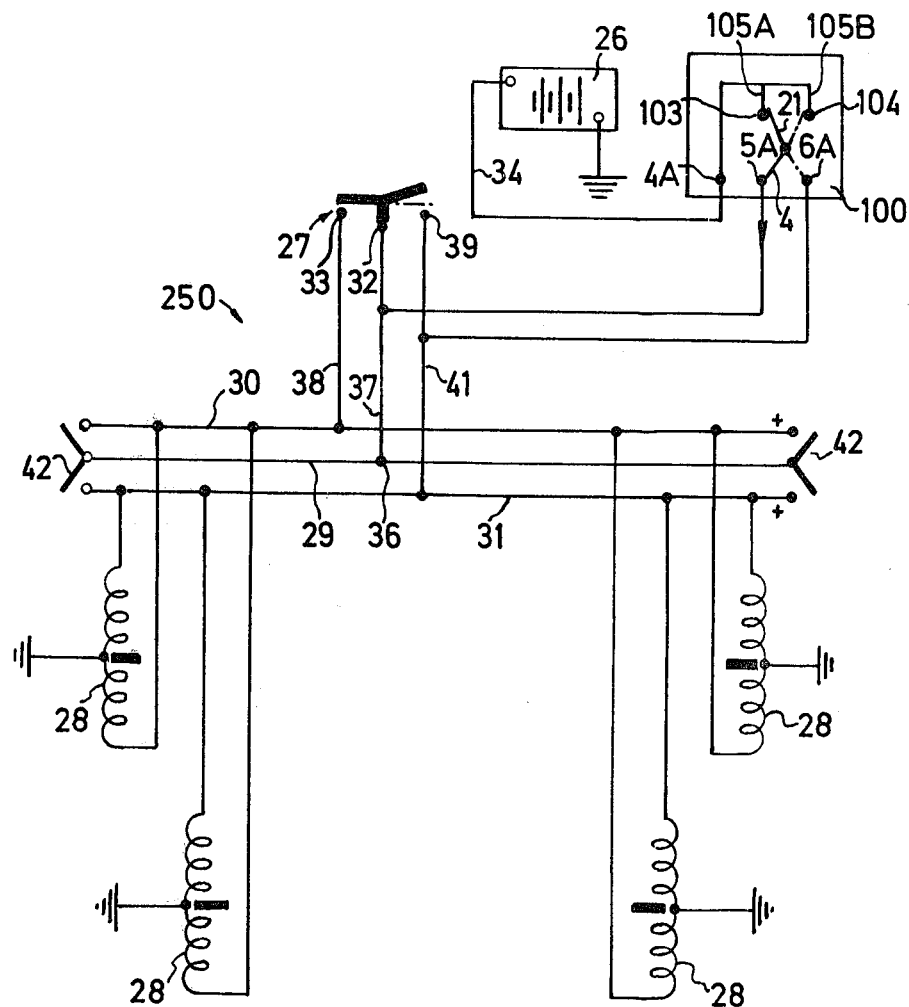
FIG. 4 is a schematic circuit diagram of an automobile door locking arrangement including the inertia switch device of FIG. 3.

In FIGS. 3 and 4, there is shown a second inertia switch device 100 and a circuit 250. FIG. 3 shows the inertia switch device 100 without its housing though of course it has one, with two internal housing parts 9 and 10 similar to those of the device 1 shown in FIG. 1.

The device 100 has an inertia mass 3, first, second and third terminals 4A, 5A and 6A, first, second and third contacts 4, 5 and 6, and a switch means 8. The first terminal 4A has a bifurcated support bracket 16' formed with limbs 17' and indentations 18', but in this case the support bracket 16' is insulated from the first terminal 4A by means of an insulating member 45. The movable contact 4 has an extension 19. The switch means 8 have an arm 20 and a bifurcated arm 21 which is connected by a biasing spring 22 to the part 19. Apart from the differences hereinbefore noted, all these parts are constructed and operate in a similar manner to their counterparts in the device 1 shown in FIG. 1. The inertia switch device 100 differs from the device 1 in that it has a thermally responsive device in the form of two bimetallic strips 101 and 102. This enables the circuit 250 to be protected against thermal overload so that the circuit does not need a separate thermal circuit breaker 44 of the kind shown in FIG. 2.

The bimetallic strip 101 has a contact 103 operable to contact the arm 21 of the switch means 8 on the side of arm 21 nearest the ball 3. The bimetallic strip 102 has a contact 104 for contacting the arm 21 on the side thereof remote from the ball 3. Electrically conductive braids 105A and 105B (each with an insulating covering) electrically connect the two strips 101 and 102 to the first terminal 4A. There is also an electrically insulating keeper or block 106 mounted under pressure of a spring 107 for slidable motion along the face of second contact 5 facing the third contact 6. As indicated, schematically, by the broken line 43, the keeper 106 is connected to the reset button 23.

As shown in FIG. 4, the line 34 from the battery 26 is connected directly to the first terminal 4A of the inertia switch device 100, which is in the "normally open" condition. In this arrangement the second contact 105A is directly connected to the line 37 feeding the neutral point 32 of the dash board switch 27. The third contact 6 or terminal 6A is directly connected to the unlock line 31 via line 41 from the point 39 of the switch 27.

In operation, the switch 27 is normally off or open. To lock the doors, it is depressed to the left to make contact between the points 32 and 33. Current flows from the battery 26 through the device 100 via terminal 4A, through the braid 105A, the bimetallic strip 101, the contact 103, the arm 21, the movable contact 4 and via the second terminal 5A to the center power line 29 and to the point 32 of the switch 27 whence it passes via the point 33 to the lock line 30. All four solenoids 28 are instantaneously and simultaneously operated to lock the doors. Normally the switch 27 is released before the temperature increases in the switch so that the bimetallic strips 101 and 102 are not operative. If however the switch 27 is held on, the strip 101 moves the arm 21 at the contact 103, thus moving the switch positively over "dead center" to the second end position in contact with the third contact 6. At the same time electrical connection is re-established with the arm 21 via the braid 105B, the strip 102, and the contact 104. After a delay, this results in the contact 104 urging the switch means 8 back over "dead center" to move the movable contact member 4 back to its position contacting the second contact 5. Meanwhile, however, the keeper 106 has been urged upwardly by the spring 107 so that the contact 4 engages the keeper 106, not the second contact 5. The circuit through the switch is broken and the whole circuit 250 can only be restored by resetting the switch device 100 by depressing the button 23 to depress the keeper 106 to the position shown in FIG. 3.

The movable contact 4 then moves to its first end position engaging the second contact 5.

In the event of, for example, an accident which moves the ball 3 to strike the arm 20, the arm 21 moves the first contact 4 as before to contact the third contact 6 so that current passes from the battery 26, through the device 100 to the unlock line 31 via line the 41 bypassing the switch 27 in the process. The solenoids 28 are operated to unlock door locks. Again the keeper 106 is urged upwardly by the spring 107 so that when the bimetallic strip 102 operates to return the movable contact 4 to contact the second contact 5, it cannot make contact with it as it engages the insulating keeper 106 instead so that the switch is electrically isolated and no current can flow to the lock line 30 so that the door locks are not automatically re-locked. The device can be reset as before by depressing the button 23.

In both the above described embodiments of the invention, the locks may be operated individually from outside the vehicle by key operated locks 42.

Figure 5:
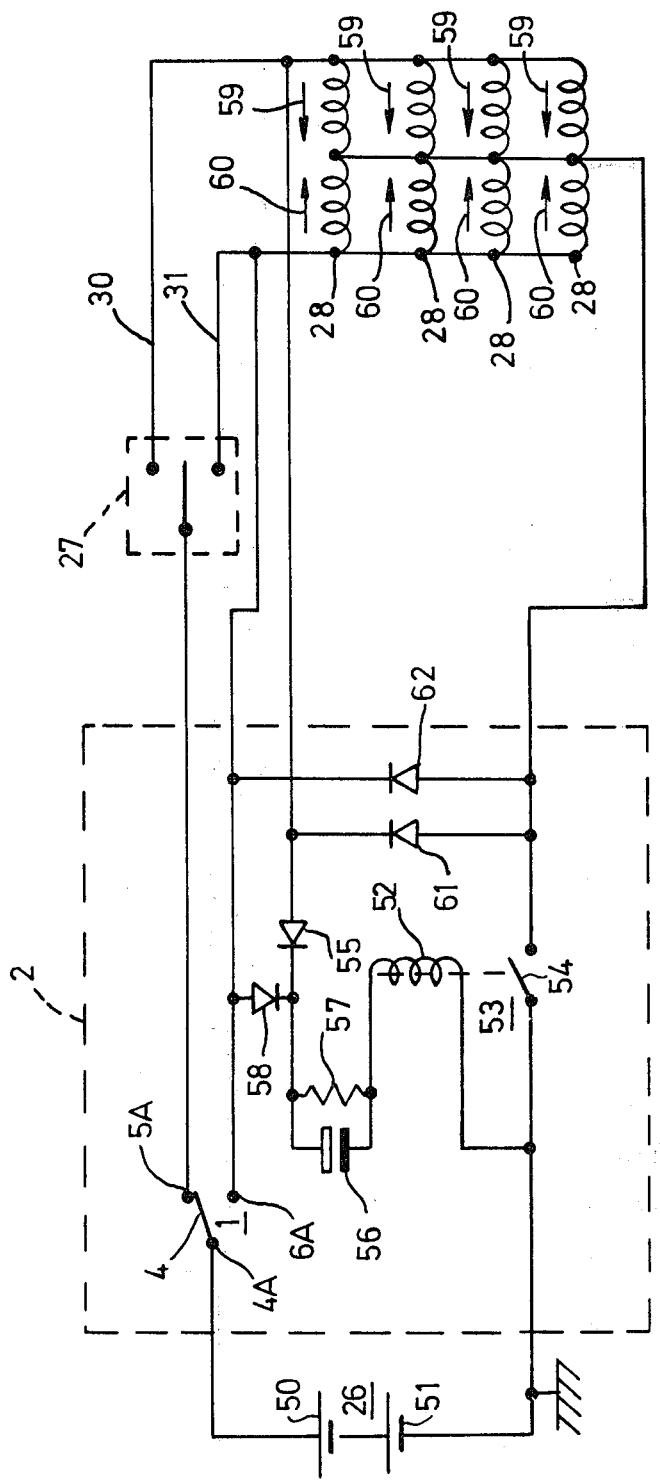
FIGS. 5 and 6 are schematic circuit diagrams of further automobile door locking arrangements including inertia switch devices in accordance with the invention.

The use of an inertia switch device in accordance with the invention will now be described in relation to another electrical circuit shown in FIG. 5 for electrically operating the door locks of a vehicle such as an automobile. The circuit is powered by the battery 26 and includes the dash board switch 27 of the "normally off" rocker type and the four center-tapped solenoids 28 each arranged to operate an associated door lock (not shown), it being assumed that the vehicle has four doors. The inertia switch device 1, as shown in FIG. 1, is connected so that it is normally in the position shown; that is, the current from a positive pole 50 of the battery 26 enters via the terminal 4A and leaves via the terminal 5A which is connected to the lock line 30 or to the unlock line 31 depending on the position of the dash board switch 27. The third terminal 6A is connected to a diode 58 and to one end of the four solenoids 28 in common.

A negative pole 51 of the battery 26 is connected to a solenoid 52 of a solenoid operated switch 53 having a pair of normally open contacts 54 arranged to connect the center tap of the four solenoids 28 to the negative pole 51 of the battery 26. The lock line 30 is connected by way of a diode 55 and a capacitor 56 shunted by a resistor 57 to the end of the solenoid 52 not connected to the negative pole 51 of the battery 26. In normal operation the inertia mass 3 is in position on its seat 13 and the movable contact 4 is in contact with the second contact 5 integral with the terminal 5A as shown. Some of the electrical components may be accommodated in the housing 2 as indicated in broken line, as described in the following paragraph.

Figure 7:
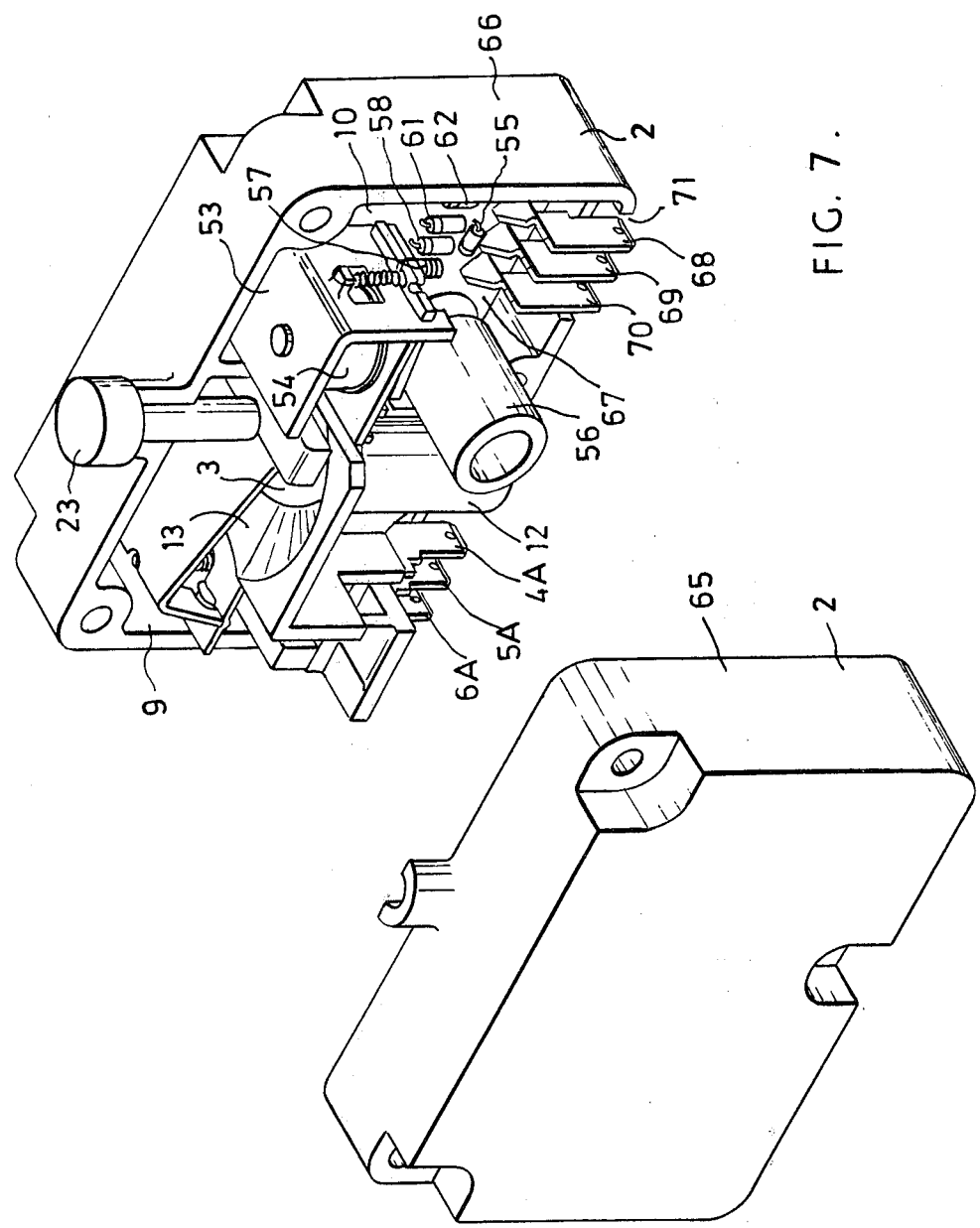
FIG. 7 is a further inertia switch device in accordance with the invention for use in the locking arrangement shown in FIG. 6.

As shown in FIG. 7, the inertia mass 3 in the form of a steel ball is accommodated in the frusto-conical seat 13 and restrained in the lowermost position in the seat 13 by the magnet 12. The housing 2 comprises two co-operating parts 65 and 66 arranged to be fitted together to enclose an internal part 9 which contains the inertia mass 3, the seat 13, the magnet 12 and the three electrical contacts connected to the terminals 4A, 5A and 6A. The manually operable button 23, which extends out of the housing 2 is arranged to engage one end of the arm 20 for resetting the electrical contacts.

The two co-operating parts 65 and 66 also enclose the internal part 10 which contains the solenoid operated switch 53, the capacitor 56 and a printed circuit board 67 on which are mounted the diodes 55, 58, 61 and 62, the resistor 57 and other electrical components. A set of terminals 68, 69 and 70, which extend through an opening 71 in the bottom of the housing 2, enable the components to be connected to the solenoids 28 and the diodes 58 and 62.

When it is desired to lock the four doors, the dash board switch 27 is rocked to the position in which it completes the circuit from the positive pole 50 via the lock line 30, the diode 55, the capacitor 56 and solenoid 52 to the negative pole 51. The current flowing to charge the capacitor 56 and flowing through the solenoid 52 closes the contacts 54, thus completing a circuit from the positive pole 50 by way of the inertia switch terminals 4A and 5A and the right-hand sides of the four solenoids 28, to the negative pole 51 of the battery 26. The flow of current through the right-hand sides of the four solenoids 28, which is indicated by the arrows 59, locks the four doors.

The switch 27 is then released. If the switch 27 is held operated, the flow of current through the solenoid 52 will cease when the capacitor 56 is fully charged, so that the contact 54 will open and prevent the solenoids 28 from drawing further current from the battery 26.

To unlock the four doors the switch 27 is rocked to the other position to connect the solenoid 52 across the battery 26 by way of the diode 58 and the capacitor 56. The current flowing to charge the capacitor 56 and flowing through the solenoid 52 closes the contacts 54, thus completing a circuit from the positive pole 50 by way of the inertia switch terminals 4A and 5A and the left-hand sides of the four solenoids 28 to the negative pole 51 of the battery 26. The flow of current through the left-hand sides of the solenoids 28, which is indicated by the arrows 60, unlocks the four doors. The switch 27 is then released. If the switch 27 is held operated, the flow of current will cease when the capacitor 56 is fully charged, so that the contacts 54 will open and prevent the four solenoids 28 from drawing further current from the battery 26.

Normally, the doors would be locked during a journey, and if there is an accident, an acceleration or deceleration is applied to the inertia switch 3 so that the predetermined threshold value is attained or exceeded. The consequential movement of the inertia mass 3 moves the movable contact 4 into engagement with the third contact 6 integral with the terminal 6A completing a circuit from the positive pole 50 by way of the diode 58, the capacitor 56, the solenoid 52 to the negative pole 51. The flow of current through the solenoid 52 to charge the capacitor 56 causes the contacts 54 to close and provide a flow of current through the left-hand sides of the four solenoids 28, as indicated by the arrows 60 which unlocks the doors. The flow of current through the solenoid 52 ceases when the capacitor 56 is fully charged so that the contacts 54 open and prevent the four solenoids 28 from drawing further current from the battery 26. The resistor 57, which allows the charge on the capacitor 56 to leak away, provides a delay which prevents the doors from being relocked within a predetermined period of time. The diodes 61 and 62 prevent arcing at the contacts during operation.

Figure 6:
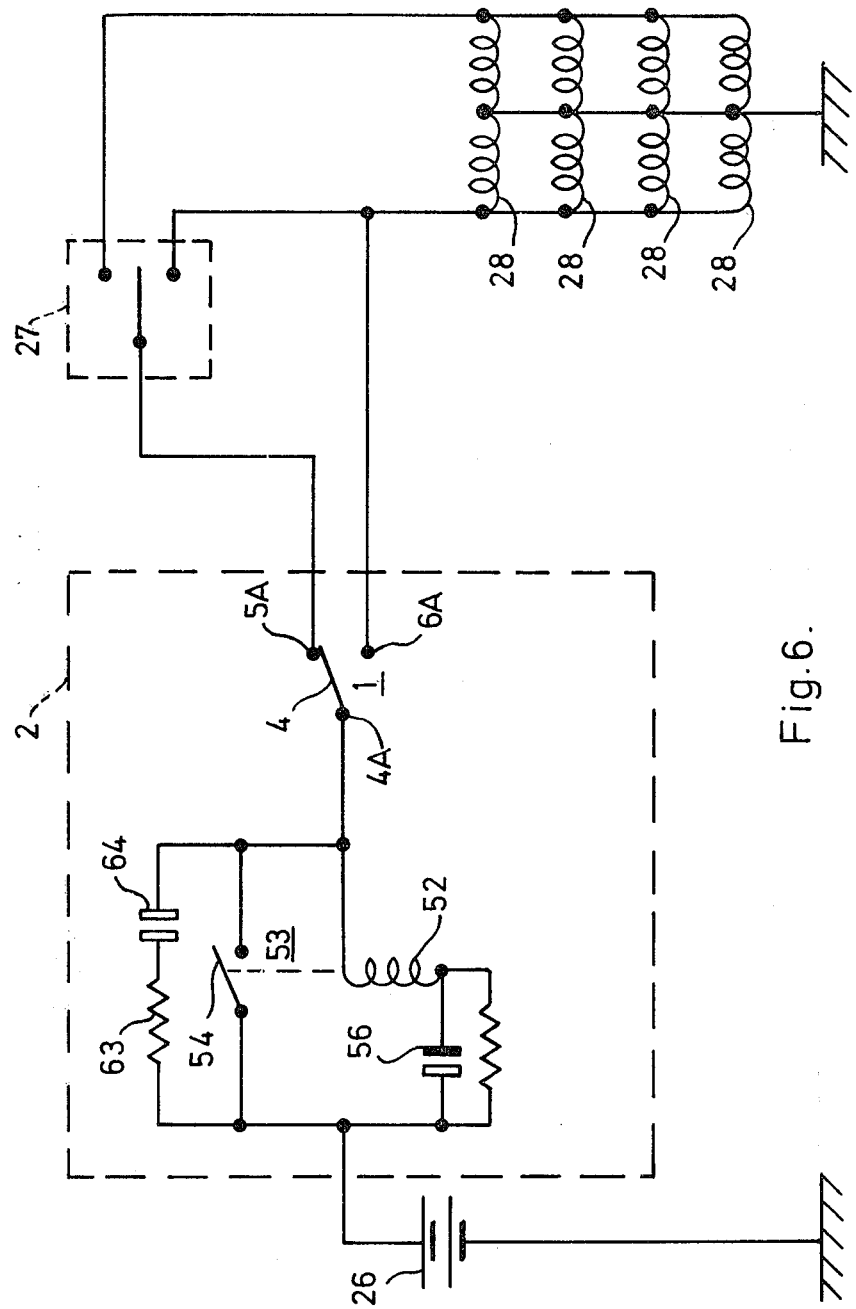

The circuit arrangement shown in FIG. 6 has an inertia switch device 1, as shown in FIG. 1, accommodated in a housing 2 together with the capacitor 56 and the solenoid operated switch 53. The terminal 5A is connected to the dash board switch 27. The four door locks are arranged to be operated by the respective center-tapped solenoids 28.

A flow of current through the solenoid 52 to charge the capacitor 56, when the switch 27 is operated, causes the contacts 54 to close and provide energizing current for the four door-locking solenoids 28. The capacitor 56, when fully charged, prevents the door-locking solenoids 28 from becoming a drain on the battery 26 if the switch 27 is held operated for a time in excess of that required to lock or unlock the doors. Moreover, after the inertia switch device 1 has been operated to unlock the doors, the flow of current through the solenoid 52 ceases when the capacitor 56 is fully charged, so that the contacts 54 open and prevent the doors from being relocked until the charge has leaked away. This delay prevents the doors from being inadvertently locked following an accident.

The RC circuit 63,64 across the contacts 54 inhibits arcing due to the inductive load provided by the solenoids 28 on their being deenergized.

Although various minor modifications might be suggested by those versed in the art, it should be understood that I wish to embody within the scope of the patent warranted hereon, all such embodiments as reasonably and properly come within the scope of my contribution to the art.

I claim:

1. An inertia switch device, comprising:
   (a) a housing having a conical seat;
   (b) an inertia mass located within the housing and movable from a rest position in response to acceleration or deceleration applied thereto, the inertia mass being formed by a spherical member located in the conical seat so as to be substantially independent of the direction of an applied acceleration or deceleration in a horizontal plane;
   (c) rigid operating means mounted within the housing and including a first arm disposed to be struck and moved by the inertia mass when the acceleration or deceleration has exceeded a threshold value, and a second arm having a bifurcated portion;
   (d) support means secured within the housing and having a bifurcated portion on which the bifurcated portion of said second arm is pivotally mounted for movement about a pivotal axis;
   (e) first, second and third electrical contacts mounted within the housing;
   (f) the first electrical contact being movable between first and second positions and disposed between and respectively engageable with the second and third electrical contacts, said first electrical contact having a bifurcated portion pivoted on said bifurcated portion of said support means; and
   (g) resilient biasing means connecting said second arm to said first electrical contact, and lying within the bifurcated portions so that a center-line of the resilient biasing means can move to either side of said pivotal axis to bias said first electrical contact stably to one of said positions dependent on the position of the operating means.

2. An inertia switch device according to claim 1, including indentations on opposite sides of said bifurcated portion of said support means, said bifurcated portions of said second arm and of said first contact being pivotally disposed therein.

3. An inertia switch device according to claim 1 including a set of three terminals connected electrically to said three electrical contacts, said terminals being accessible from the exterior of said housing.

4. An inertia switch device according to claim 3, including a movable member coupled to said operating means and extending through said housing, the position of said movable member being an indicator of whether said threshold value has been exceeded, and said movable member being a reset member for restoring said first electrical contact to its other stable position if said threshold value has been exceeded, and for simultaneously assuring return of said inertia mass to said rest position.

5. An inertia switch device according to claim 1 including switch means in series with said first electrical contact for moving said first electrical contact between said first and second positions when electrical energy passing through said switch means exceeds a predetermined value.

6. An inertia switch device according to claim 5, said switch means being two bimetallic elements arranged to be alternately connected to said first electrical contact when said first electrical contact is in said first and second stable positions, said elements being respectively operable to move said first electrical contact between said first and second stable positions in response to the exceeding of said predetermined value.

7. An inertia switch device according to claim 5 including means responsive to movement of said first electrical contact out of said first stable position for delaying reestablishment of current flow when said first electrical contact is returned toward said first stable position, and a manually movable member for resetting said delaying means.

8. An inertia switch device according to claim 1, including capacitance means connected in series with said third electrical contact, and arranged to conduct a charging current when said threshold value has been exceeded, and connecting means responsive to said charging current for temporarily energizing a load through said third electrical contact during the charging of said capacitance means.

9. An inertia switch device according to claim 8, said connecting means comprising a relay having a coil through which said charging current passes and having relay contacts through which current for the load is conducted, whereby the load is deenergized when said charging current is substantially reduced.

10. An inertia switch device according to claim 8, including a timing resistor connected across said capacitance means for controlling the duration of time that the load can be energized.

* * * * *